(12) United States Patent
Seder et al.

(10) Patent No.: US 11,106,044 B2
(45) Date of Patent: Aug. 31, 2021

(54) EYE HEIGHT BASED VIRTUAL IMAGE ALIGNMENT FOR HEAD-UP DISPLAY

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US); Leslie G. Ferris, Clinton Township, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/459,994

(22) Filed: Jul. 2, 2019

(65) Prior Publication Data

US 2021/0003851 A1  Jan. 7, 2021

(51) Int. Cl.
*G09G 5/00* (2006.01)
*G02B 27/01* (2006.01)
*G09G 5/38* (2006.01)

(52) U.S. Cl.
CPC ..... *G02B 27/0179* (2013.01); *G02B 27/0101* (2013.01); *G09G 5/38* (2013.01); *G02B 2027/0181* (2013.01); *G02B 2027/0198* (2013.01); *G09G 2320/0606* (2013.01); *G09G 2354/00* (2013.01)

(58) Field of Classification Search
CPC .................................................. G02B 27/0101
See application file for complete search history.

(56) References Cited

U.S. PATENT DOCUMENTS

| | | | |
|---|---|---|---|
| 2006/0114553 A1* | 6/2006 | Laudo | B01L 9/06 359/368 |
| 2014/0253821 A1* | 9/2014 | Takatoh | B60K 35/00 349/11 |
| 2019/0163268 A1* | 5/2019 | Shin | H04N 13/204 |

* cited by examiner

Primary Examiner — Nan-Ying Yang
(74) Attorney, Agent, or Firm — Harness, Dickey & Pierce, P.L.C.

(57) ABSTRACT

An alignment system for a HUD is provided and includes a mirror, a mirror actuator, first and second light sources, an optic assembly, and a control module. The mirror actuator adjusts mirror orientation. The first light source generates a first light beam. The mirror directs the first light beam from the HUD to a combiner to generate a virtual image. The second light source generates a second light beam. The optic assembly directs the second light beam to the combiner to generate a fiducial. The control module: performs an alignment process including, based on received inputs, controlling the mirror actuator to adjust mirror orientation to adjust a position of the virtual image and align a portion of the virtual image, the fiducial and an eye of a viewer; determines a height of the eye based on a mirror angle; and displays another virtual image based on the height.

21 Claims, 4 Drawing Sheets

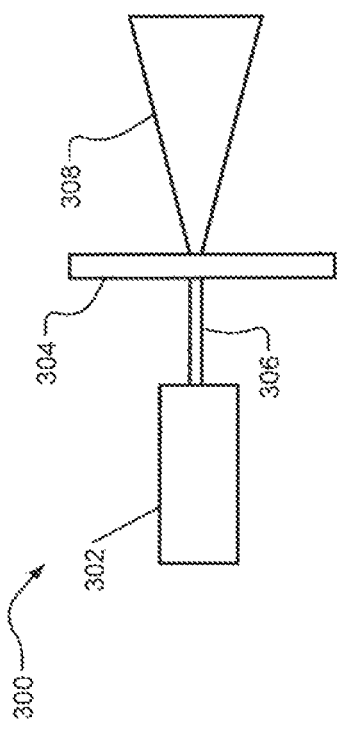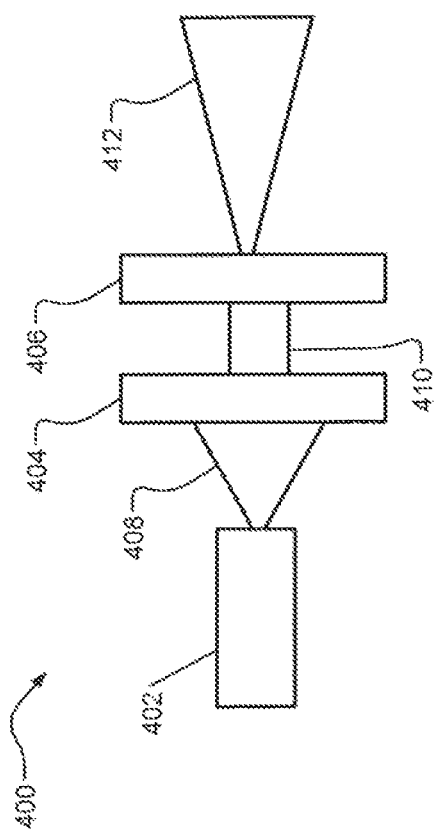

EYE HEIGHT BASED VIRTUAL IMAGE ALIGNMENT FOR HEAD-UP DISPLAY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head-up displays (HUD).

A HUD includes an image generator, projection optics with an adjustable mirror and a combiner. As an example, the combiner may be implemented as a windshield of a vehicle. The image generator outputs a light beam to projection optics, which then reflect the light beam to the combiner via the adjustable mirror. The light beam includes an image that is sized, flipped, positioned and reflected by the windshield. The windshield serves as a reflector by which the image is visible to a driver of the vehicle as a virtual image, which is perceived by the driver as being shown within an environment forward of the vehicle. The adjustable mirror is tilted to adjust a height of the virtual image.

The driver of the vehicle may adjust the height of the virtual image via a manual controller. For example, a manual controller may be located on a dashboard of the vehicle and include a switch that when toggled moves the virtual image up or down relative to the driver. This allows the driver to place the virtual image at the appropriate height to be visible to the driver.

SUMMARY

An alignment system for a head-up display is provided and includes at least one interface, a mirror, a mirror actuator, a first light source, a second light source, a fiducial optic assembly, and a control module. The at least one interface is configured to receive inputs from a system operator. The mirror actuator is configured to adjust at least one of a position or an orientation of the mirror. The first light source configured to generate a first light beam. The mirror is configured to direct the first light beam from the head-up display to a combiner to generate a first virtual image. The second light source is configured to generate a second light beam. The fiducial optic assembly is configured to direct the second light beam to the combiner to generate a fiducial on the combiner. The control module is configured to: perform an alignment process including, based on the inputs, controlling the mirror actuator to adjust the at least one of the position or the orientation of the mirror to adjust a vertical position of the first virtual image and align a portion of the first virtual image, the fiducial and an eye of the system operator; subsequent to completing the alignment process, determining a height of the eye of the system operator based on an angle of the mirror; and displaying a second virtual image based on the height of the eye of the system operator.

In other features, the control module is configured to: control the first light source to generate the first light beam such that the first virtual image includes an image of an alignment object; based on the inputs, adjust a vertical position of the alignment object to align the alignment object, the fiducial and the eye of the system operator; and in response to determining alignment of the alignment object, the fiducial and the eye of the system operator is complete, determining the height of the eye of the system operator based on the angle of the mirror.

In other features, the alignment system further includes a memory. The memory is configured to store a look-up table relating angles of the mirror to eye heights. The control module is configured to determine the height of the eye of the system operator based on the look-up table.

In other features, the control module is configured to: instruct the system operator to adjust the height of the first virtual image to align the fiducial with the portion of the first virtual image; and receive one of the inputs when the fiducial is aligned with the portion of the first virtual image.

In other features, the control module is configured to: instruct the system operator to center the fiducial in a predetermined portion of the first virtual image; and receive one of the inputs when the fiducial is centered in the predetermined portion of the first virtual image.

In other features, the control module is configured to receive an input from the system operator indicating alignment cannot be completed and in response indicate to the system operator to adjust a seat height because the height of the eye of the system operator is out of range for using the head-up display.

In other features, the control module is configured to maintain the fiducial at a fixed location on the combiner during the alignment process.

In other features, the fiducial optic assembly includes a holographic diffuser.

In other features, the fiducial optic assembly comprises a collimation optic.

In other features, the fiducial optic assembly comprises a light patterning optic.

In other features, a method of operating an alignment system for a head-up display is provided. The method includes: receiving inputs from a system operator via an interface; generating a first light beam; directing the first light beam, via a mirror, from the head-up display to a combiner to generate a first virtual image; generating a second light beam; directing the second light beam to the combiner to generate a fiducial on the combiner; performing an alignment process including, based on the inputs, adjusting at least one of a position or an orientation of the mirror to adjust a vertical position of the first virtual image and align a portion of the first virtual image, the fiducial and an eye of the system operator; subsequent to completing the alignment process, determining a height of the eye of the system operator based on an angle of the mirror; and displaying a second virtual image via the head-up display based on the height of the eye of the system operator.

In other features, the method further includes: generating the first light beam such that the first virtual image includes an image of an alignment object; based on the inputs, adjusting a vertical position of the alignment object to align the alignment object, the fiducial and the eye of the system operator; and in response to determining alignment of the alignment object, the fiducial and the eye of the system operator is complete, determining the height of the eye of the system operator based on the angle of the mirror.

In other features, the method further includes: storing a look-up table relating angles of the mirror to eye heights in a memory; and determining the height of the eye of the system operator based on the look-up table.

In other features, the method further includes: instructing the system operator to adjust the height of the first virtual image to align the fiducial with the portion of the first virtual image; and receiving one of the inputs when the fiducial is aligned with the portion of the first virtual image.

In other features, the method further includes: instructing the system operator to center the fiducial in a predetermined portion of the first virtual image; and receiving one of the inputs when the fiducial is centered in the predetermined portion of the first virtual image.

In other features, the method further includes receiving an input from the system operator indicating alignment cannot be completed and in response indicating to the system operator to adjust a seat height because the height of the eye of the system operator is out of range for using the head-up display.

In other features, the method further includes maintaining the fiducial at a fixed location on the combiner during the alignment process.

In other features, the method of further includes passing the second light beam through a fiducial optic assembly including a holographic diffuser.

In other features, the method further includes passing the second light beam through a fiducial optic assembly including a collimation optic.

In other features, the fiducial optic assembly includes a light patterning optic.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is an example fiducial generating system including a laser light source and a holographic diffuser in accordance with an embodiment of the present disclosure;

FIG. 4 is another example fiducial generating system including a light emitting diode (LED) light source and collimation and pattern generation optics in accordance with an embodiment of the present disclosure.

In the drawings, reference numbers may be reused to identify similar and/or identical elements.

DETAILED DESCRIPTION

Augmented reality HUD systems require alignment of an image to a viewer's eye position, such that virtually displayed images align with real world objects. As an example, if an augmented reality HUD system is to outline an object that is located forward of a vehicle, in order for the outline to be aligned with the object as viewed by a driver of the vehicle, the augmented reality HUD system needs to know the locations of the driver's eyes. Without alignment, the driver (or viewer) will not see augmented reality HUD information (e.g., virtual images) overlaying corresponding real world information (e.g., real world objects). An eye tracking system including one or more cameras may be used to track the locations of the eyes of a driver, however such systems are costly, consume considerable space within a vehicle, and can have associated latency and warranty issues.

The examples set forth herein include a virtual image alignment system that determines heights of eyes of viewers without using an eye tracking system. The virtual image alignment system performs an alignment process that involves aligning calibration graphic images, which are seen by viewers as virtual images, with generated fiducials and based on this alignment determining the heights of the viewer's eyes.

Figure 1:
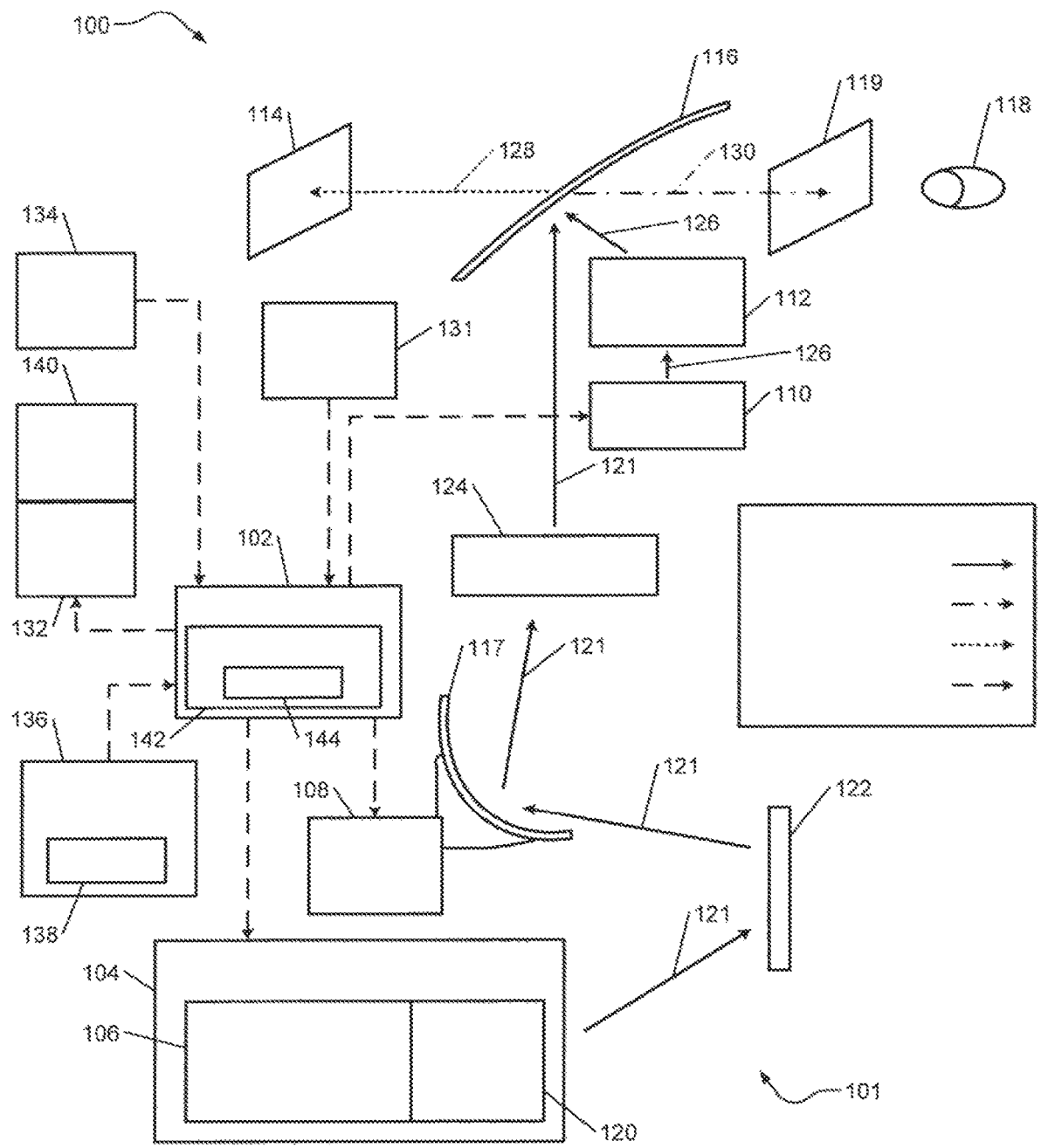
FIG. 1 is a functional block diagram of an example a virtual image alignment system in accordance with an embodiment of the present disclosure.

FIG. 1 shows a virtual image alignment system 100 that includes a HUD 101. The virtual alignment system 100 includes a control module 102, an image generating module 104 including a first light source 106, a mirror actuator 108, a second light source 110 and a fiducial optic assembly 112. The control module 102 controls operation of the image generating module 104 and first light source 106 to generate virtual images, which are shown in a virtual image plane 114. The control module 102 also controls operation of the second light source 110 to generate fiducials (e.g., fixed points of light or fixed images) on, for example, a windshield 116 or other combiner. One or more fiducials may be shown and are in predetermined fixed locations on the windshield 116. The control module 102 controls operation of the mirror actuator 108 to rotate or tilt a mirror 117 and adjust positions of the virtual images relative to a viewer's eye 118. The mirror actuator may include a motor, gears, shafts, and/or other components to change the position and/or orientation of the mirror 117. The virtual images may be viewable anywhere within an area of an eye box 119. If the viewer's eye 118 is located, such that the eye box 119 is not disposed between the viewer's eye and the virtual image plane 114 or the viewer's eye 118 is located outside of the eye box 119, then the viewer is unable to view a portion or all of the virtual images being displayed. The mirror 117 may magnify the image generated by the image generating module 104 and/or correct for distortions associated with the windshield 116.

The image generating module 104 may include the first light source 106 and a display and lens assembly 120. The first light source 106 generates a light beam 121 including graphic images that are projected onto a display of the display and lens assembly 120. The light beam 121 is then directed at a series of one or mirrors 122. The one or more mirrors 122 may include, for example, a fold mirror. The one or more mirrors 122 may be used for packaging reasons. The light beam 121 is reflected at the mirror 117 and then reflected through light and glare traps 124 to the windshield 16. The light beam 121 is reflected by the windshield towards the viewer's eye 118 to be seen as one or more virtual images. The light and glare traps 124 may filter and thus prevent, for example, sun light (or ambient light) from being reflected from the windshield 116 towards the mirror 117 and minimize effects of glare.

The second light source 110, which may include a laser, one or more light emitting diodes (LEDs), or other fiducial generating light source. The second light source 110 generates a shaped light beam 126, which is directed through the fiducial optic assembly 112 and reflected off of the windshield 116 to be viewed by the viewer as one or more fiducials.

The dashed line 128 represents the virtual images seen in the virtual image plane 114. The dashed line 130 represents the images seen by the viewer due to the reflected light from the light beam 121 associated with the virtual image 121, and the scattered light from the windshield 116 by the light source 126.

In one embodiment, the HUD 101 includes the image generating module 104, the mirror actuator 108, the mirror 117 and the one or more mirrors 122. In another embodiment, the HUD 101 also includes the second light source 110 and the fiducial optic assembly 112. In one embodiment, the image generating module 104, the mirror actuator 108, the mirror 117, and the one or more mirrors 122 are implemented in a separate housing than the second light source 110 and the fiducial optic assembly 112. In another embodiment, the image generating module 104, the mirror actuator 108, the mirror 117, the one or more mirrors 122, the second light source 110 and the fiducial optic assembly 112 are implemented in a single housing. The package size of the single housing is smaller than the package size of an eye tracking system and does not require a heat sink.

The virtual image alignment system 100 may further include and/or be connected to a display 131, seat motors 132, seat switches 134, a manual controller 136 including switches 138. The display 131 may be, for example, a touchscreen, an infotainment display located in a center console of a vehicle, or other display. The seat motors 132 are used to position one or more seats (one seat 140 is shown). The control module 102 may control operations of the seat motors 132 based on user inputs via the seat switches 134 and/or seat settings stored in memory 142. The manual controller 136 may be used by a user to manually adjust height of virtual images provided by the image generating module 104 via the switches 138. The display 131 and the switches 134, 138 may be referred to as input devices and/or interfaces.

The light beam 121 may follow a main ray path of a virtual image from a center of a HUD display, which is part of the display and lens assembly 120) to the windshield 116. The main ray path is referred to as a gut ray. The light beam 126 may follow a different path than the light beam 121. The path of the light beam 126 may or may not be parallel to a portion of or the entire path of the light beam 121. The light beams 121, 126 do not need to follow the same optical path.

Figure 2:
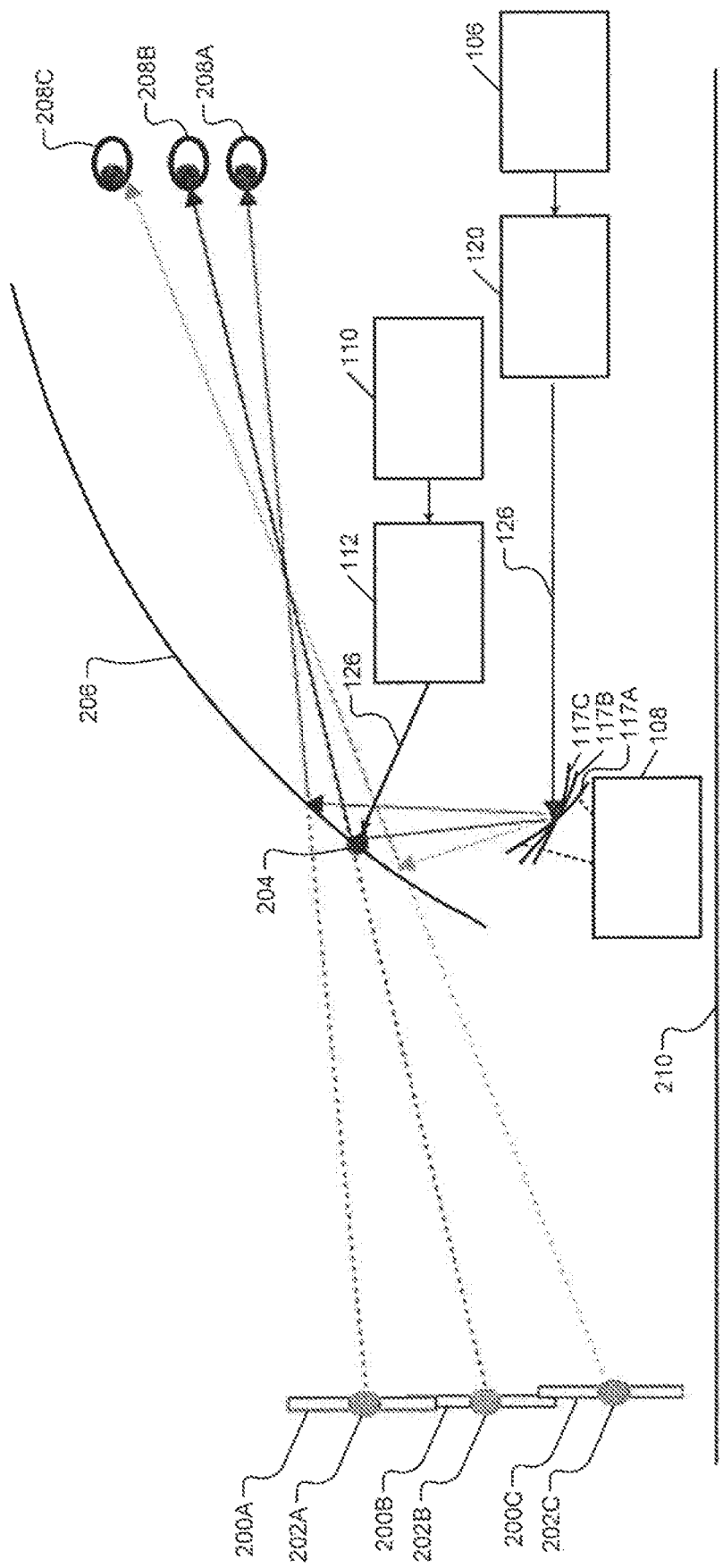
FIG. 2 is a virtual image and eye alignment diagram in accordance with an embodiment of the present disclosure.

FIG. 2 shows a virtual image and eye alignment diagram. During the alignment process a virtual image 200 or portion 202 thereof is aligned with a fiducial 204 displayed on a windshield 206 to determine a height of a viewer's eye 208 relative to a reference plane 210. The reference plane 210 may be at any level relative to the windshield 206. In one embodiment, the reference plane 210 is horizontal and/or extends parallel to a road surface on which a corresponding vehicle is located.

During operation, the first light source 106 and the display and lens assembly 120 generate the first light beam 121 that is reflected off the mirror 117 and directed at the windshield to display the virtual image 200. The second light source 110 generates the second light beam 126, which is directed through the fiducial optical assembly 112 and at the windshield 206 to provide the fiducial 204. The fiducial 204 remains in a fixed position on the windshield 206 during the virtual image alignment processing. The mirror actuator 108 may be used to tilt the mirror 117 to any number of angular positions, three positions 117A, 117B, and 117C are shown to adjust the vertical position of the virtual image 200. The location of the fiducial 204 may be calibrated and/or adjusted at a manufacturing facility (referred to as in-plant) to dial out horizontal misalignment.

During alignment, the virtual image 200, which includes the portion 202, is moved in a vertical direction until the portion 202 is aligned with fiducial 204 as viewed by the driver's eye 208, meaning the fiducial is seen by the viewer as being located in front of and/or centered on the portion 202. The portion 202 is a graphic image at the display of the image generating module 104 of FIG. 1. The portion 202, as an example, is shown as a dot in FIG. 2. The portion 202 may be implemented as a cross hair or other object. In an embodiment, the viewer adjusts the position of the portion 202 via one of the switches 138 of the manual controller 136 of FIG. 1. In the example shown, the virtual image 200 and the portion 202 are shown in three positions (identified as 200A, 200B, 200C and 202A, 202B, 202C). These positions correspond respectively with the different eye heights (identified as 208A, 208B, 208C) for viewers of different height. When the virtual image is aligned with the fiducial, a linear path exists between the portion 202, the fiducial and the viewer's eye 208, as shown.

FIG. 3 shows a fiducial generating system 300 that includes a laser light source 302 and one or more diffusing optics (referred to as a holographic diffuser) 304. This is an example implementation of the second light source 110 and the fiducial optic assembly 112 of FIG. 1. The laser light source 302 generates a laser beam 306, which is directed the holographic diffuser 304, which diffuses the laser beam 306 to provide a diffused beam 308 having a larger diameter than the laser beam 306. The diffused beam 308 may be directed at, for example, a windshield.

FIG. 4 shows a fiducial generating system 400 including a light emitting diode (LED) light source 402, one or more collimation optics 404 and one or more pattern generation optics 406. This is another example implementation of the second light source 110 and the fiducial optic assembly 112 of FIG. 1. The LED light source 402 may include one or more LEDs that generate a light beam 408 that is directed at the one or more collimation optics 404. The one or more collimation optics 404 collimate the light beam 408 to (i) provide a light beam 410 having a smaller diameter that the light beam 408, and (ii) ensure sufficient light intensity of a fiducial. The one or more pattern generation optics 406 may shift, pattern, diffuse, and/or otherwise alter the pattern of the light beam 410 to generate a light beam 412. The light beam 412 may be directed at, for example, a windshield.

Figure 5:
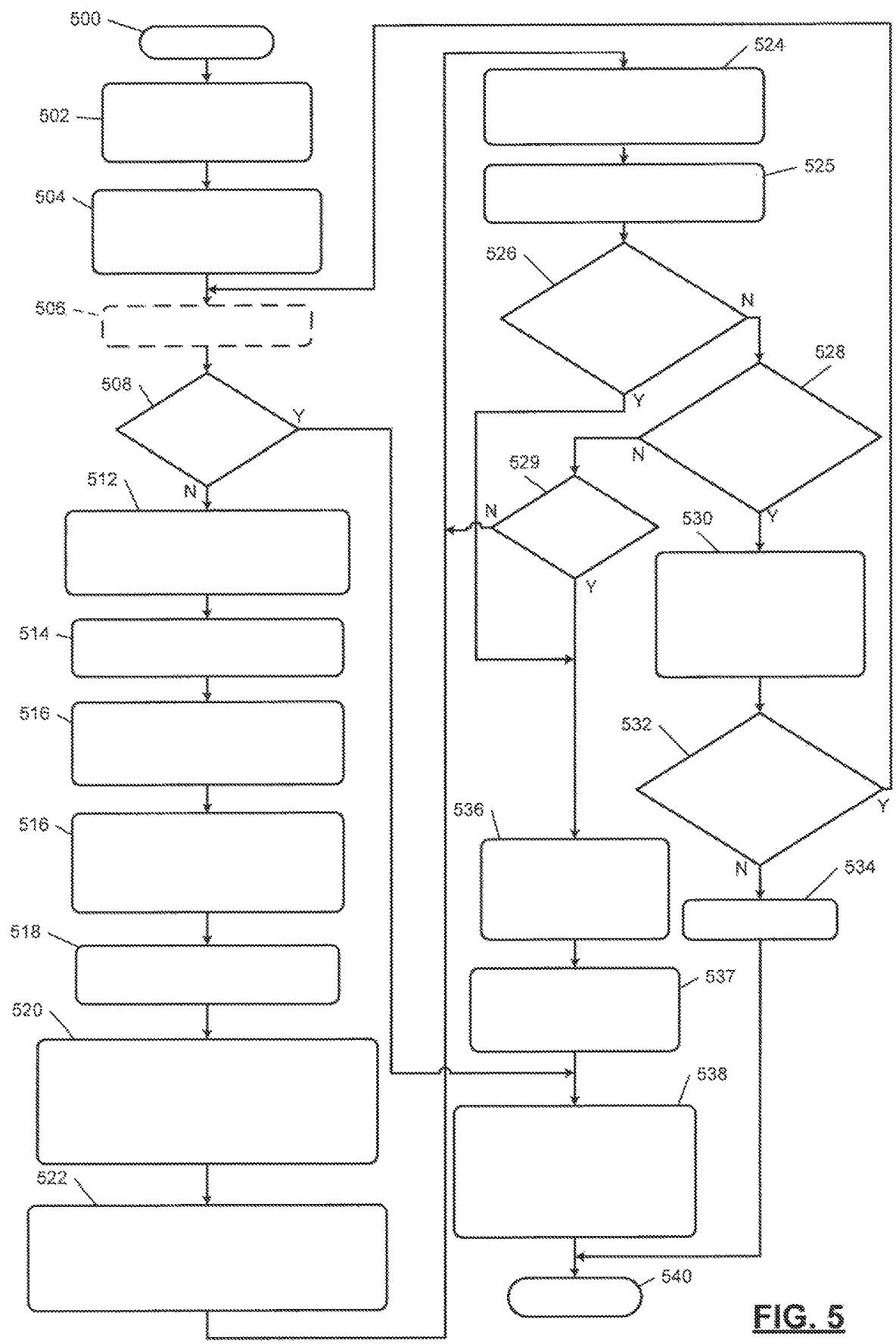
FIG. 5 illustrates an example virtual image alignment method in accordance with an embodiment of the present disclosure.

An example method of operating the virtual image alignment system is illustrated in FIG. 5. Although the following operations are primarily described with respect to the implementation of FIG. 1-4, the operations may be easily modified to apply to other implementations of the present disclosure. The following operations may be iteratively performed and may be performed by the control module 102 of FIG. 1.

The method may begin at 500. At 502, the control module 102 waits for a driver to sit in the seat 140 and/or for driver to provide an input to adjust settings. The settings may include seat position settings and/or HUD settings (e.g., height of virtual image displayed by HUD). At 504, the control module 102 receives an input from the driver to adjust settings. This may include a request to adjust a height of the seat 140, which may include the driver actuating one or more of the switches 134, interacting with the display 131, and/or providing input via some other manner. The driver may select a seat position via a seat memory selection switch, which may be one of the switches 134.

At 506, based on the received input, the control module 102 may (i) position the seat to a new position and store the new position for the driver in the memory 142, or (ii) return the seat 140 to a stored seat position based on certain memory setting associated with the driver. The seat position may be stored in association with an identifier (ID) of the driver and/or in association with an ID of one of the switches 134.

At 508, the control module 102 may determine whether an eye height is stored for the driver. This may be based on a driver selected seat position, the ID of the driver and/or an ID of the seat memory selection switch. If an eye height is stored for the driver, operation 538 may be performed, otherwise operation 512 may be performed.

At 512, the control module 102 displays a virtual image at a default centrally located height or height for a previous driver via the first light source 106. At 514, the control module 102 receives an input from the driver to adjust the height of the virtual image. The input may be received via the switches 136, the display 131 or another input device.

At 516, the control module 102 adjusts height of the virtual image to place the virtual image in a position visible to the driver. At 517 and in response to this adjustment, the control module 102 may display a message to driver suggesting and/or asking whether the driver wants to initiate the alignment process. This may be displayed as a virtual image using the HUD, displayed on the display 131, or indicated in some other manner. By asking the driver to perform calibration of augmented reality (AR) system by initiating and performing the alignment process, the driver feels involved in the technology, which can have a positive effect on the experience of using the HUD.

At 518, the control module 102 receives an input from the driver to initiate alignment process. The input may be received via the switches 136, the display 131 or another input device.

At 520, the control module 102, based on the input received at 518, initiates the alignment process including displaying a calibration graphic image (e.g., a dot, a cross hair or other alignment object) in a virtual image via the first light source 1-6 and displays a fiducial on a windshield (e.g., the windshield 116) via the second light source 110. The fiducial location on the windshield may be fixed and may not change with different drivers and corresponding driver perspectives.

At 522, the control module 102 indicates to the driver to adjust the height of the calibration graphic, such that the calibration graphic image is aligned with the fiducial. This indication may be, for example displayed via the HUD as part of the virtual image, as part of another virtual image, on the display 131 or via another interface. At 524, the control module 102 receives an input from the driver to adjust the height of the calibration graphic image, such that the calibration graphic image is visible and at the appropriate height for the driver. At 525, the control module 102 adjusts the height of the virtual image based on the driver input received at 524 this includes adjusting the position and/or orientation of the mirror 117 as described above. In an embodiment, the mirror 117 is tilted and/or rotated to adjust the vertical position of the virtual image and the calibration graphic image.

At 526, the control module 102 determines whether an input has been received indicating alignment completed. The input may be received via the switches 136, the display 131 or another input device. If the input has not been received, operation 528 may be performed, otherwise operation 536 may be performed.

At 528, the control module 102 determines whether an input from the driver has been received indicating alignment cannot be completed. The input may be received via the switches 136, the display 131 or another input device. If the input has been received, operation 530 may be performed, otherwise operation 529 may be performed.

At 530, the control module 102 indicates to the driver to adjust seat height because the eye height is out of range for use of HUD. This may occur when the eye height is, below, above and/or otherwise outside a predetermined eye box for the HUD. When the driver's eye is within the eye box, the driver is able to view the virtual images displayed.

At 532, the control module 102 determines whether an input is received from the driver to adjust the seat height. If an input is received, operation 506 may be performed, otherwise operation 534 may be performed. At 534, the control module 102 disables the HUD 101.

At 536, the control module 102 determines a height of the driver's eyes based on the current angle of the mirror 117 as positioned at the completion of the alignment process. This may include looking up the height of the driver's eyes in a look-up table (LUT) 144 stored in the memory 142. The LUT 144 may relate angles (e.g., tilt angles) of the mirror 117 to respectively different eye heights, which may be based on predetermined known locations of the fiducial and the calibration graphic images for the different angles of the mirror. Table 1 is an example LUT and may be updated at 537. The table may also indicate viewer and/or driver (viewer/driver) IDs, Seat Position for a particular viewer/driver, and/or ID of seat memory selection switch for the particular viewer/driver. The table may be updated to include this information for a particular driver when the alignment process is performed. Each row of the table may relate mirror angle to eye heights, which may be determined and/or set during manufacturing of a vehicle. The other entries of the table may be determined during setup at a dealer of the vehicle and/or during use of the vehicle.

TABLE 1

| Mirror Angle | Eye Height | Viewer/Driver ID | Seat Position for Viewer/Driver | ID of Seat Memory Selection Switch for Viewer/Driver |
|---|---|---|---|---|
| First Angle | First Height | 1 | Seat Height for Driver 1 | 1 |
| Second Angle | Second Height | | | |
| Third Angle | Third Height | | | |
| Fourth Angle | Fourth Height | 2 | Seat Height for Driver 2 | 2 |
| Fifth Angle | Fifth Height | 3 | Seat Height for Driver Three | 3 |
| Sixth Angle | Sixth Height | | | |

As an example, a dealer representative may help a purchaser of a vehicle set HUD settings at a dealership upon purchase of the vehicle. At this point, the mirror angle for the purchaser may be set and the eye height of the purchaser may be determined. The table may have any number of rows and corresponding entries. As an alternative to specific mirror angles, the table may include ranges of mirror angles. As an alternative to specific eye height entries, the table may include ranges of eye heights. Multiple drivers may have the same seat height and/or share a same seat memory selection switch ID and/or seat settings, but have different driver IDs.

At 537, the control module 102 stores the current angle of the mirror 117, the determined height of the driver's eyes, and a driver and/or switch ID as part of the LUT 144. This information may be stored upon determining that the alignment process is completed.

At 538, the control module 102 performs HUD operations based on the stored eye height including displaying virtual images for AR at predetermined and/or appropriate heights for the driver via the first light source 106. The method may end at 540. The height of the AR graphic image shown is adjusted based on the known eye height to maintain a same road coverage or field-of-view.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

While the examples shown herein are primarily described as being implemented within a vehicle, the examples may be applied to non-vehicular implementations. The examples may be applied to applications where alignment of a virtual image and a viewer eye is performed. The examples disclosed herein do not include a camera and/or eye tracking system and are able to achieve image registration (i.e. road coverage) in a reduced package size.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An alignment system for a head-up display, the alignment system comprising:
    at least one interface configured to receive a plurality of inputs from a system operator;
    a mirror;
    a mirror actuator configured to adjust at least one of a position or an orientation of the mirror;
    a first light source configured to generate a first light beam,
    wherein the mirror is configured to direct the first light beam from the head-up display to a combiner to generate a first virtual image;
    a second light source configured to generate a second light beam;
    a fiducial optic assembly configured to direct the second light beam to the combiner to generate a fiducial on the combiner; and
    a control module configured to,
        perform an alignment process including, based on the plurality of inputs, controlling the mirror actuator to adjust the at least one of the position or the orientation of the mirror to adjust a vertical position of the first virtual image and align a portion of the first virtual image, the fiducial and an eye of the system operator,
        subsequent to completing the alignment process, determining a specific eye height value of the eye of the system operator based on an angle of the mirror, and
        displaying a second virtual image based on the determined specific eye height value of the eye of the system operator.

2. The alignment system of claim 1, wherein the control module is configured to:
    control the first light source to generate the first light beam such that the first virtual image includes an image of an alignment object;
    based on the plurality of inputs, adjust a vertical position of the alignment object to align the alignment object, the fiducial and the eye of the system operator; and
    in response to determining alignment of the alignment object, the fiducial and the eye of the system operator is complete, determining the specific eye height value of the eye of the system operator based on the angle of the mirror.

3. The alignment system of claim 1, further comprising a memory, wherein:
    the memory is configured to store a look-up table relating a plurality of angles of the mirror to a plurality of eye heights; and
    the control module is configured to determine the specific eye height value of the eye of the system operator based on the look-up table.

4. The alignment system of claim 1, wherein the control module is configured to:
    instruct the system operator to adjust a height of the first virtual image to align the fiducial with the portion of the first virtual image; and
    receive one of the plurality of inputs when the fiducial is aligned with the portion of the first virtual image.

5. The alignment system of claim 1, wherein the control module is configured to:
    instruct the system operator to center the fiducial in a predetermined portion of the first virtual image; and
    receive one of the plurality of inputs when the fiducial is centered in the predetermined portion of the first virtual image.

6. The alignment system of claim 1, wherein the control module is configured to receive an input from the system operator indicating alignment cannot be completed and in response indicate to the system operator to adjust a seat height because the specific eye height value of the eye of the system operator is out of range for sing the head-up display.

7. The alignment system of claim 1, wherein the control module is configured to maintain the fiducial at a fixed location on the combiner during the alignment process while the first virtual image is moved relative to and aligned with the fiducial.

8. A method of operating an alignment system for a head-up display, the method comprising:
    receiving a plurality of inputs from a system operator via an interface;
    generating a first light beam;
    directing the first light beam, via a mirror, from the head-up display to a combiner to generate a first virtual image;
    generating a second light beam;
    directing the second light beam to the combiner to generate a fiducial on the combiner;

performing an alignment process including, based on the plurality of inputs, adjusting at least one of a position or an orientation of the mirror to adjust a vertical position of the first virtual image and align a portion of the first virtual image, the fiducial and an eye of the system operator;

subsequent to completing the alignment process, determining a specific eye height value of the eye of the system operator based on an angle of the mirror; and displaying a second virtual image via the head-up display based on the determined specific eye height value of the eye of the system operator.

9. The method of claim 8, further comprising:
generating the first light beam such that the first virtual image includes an image of an alignment object;
based on the plurality of inputs, adjusting a vertical position of the alignment object to align the alignment object, the fiducial and the eye of the system operator; and
in response to determining alignment of the alignment object, the fiducial and the eye of the system operator is complete, determining the specific eye height value of the eye of the system operator based on the angle of the mirror.

10. The method of claim 8, further comprising:
storing a look-up table relating a plurality of angles of the mirror to a plurality of eye heights hi a memory; and
determining the specific eye height value of the eye of the system operator based on the look-up table.

11. The method of claim 8, further comprising:
instructing the system operator to adjust the height of the first virtual image to align the fiducial with the portion of the first virtual image; and
receiving one of the plurality of inputs when the fiducial is aligned with the portion of the first virtual image.

12. The method of claim 8, further comprising:
instructing the system operator to center the fiducial in a predetermined portion of the first virtual image; and
receiving one of the plurality of inputs when the fiducial is centered in the predetermined portion of the first virtual image.

13. The method of claim 8, further comprising receiving an input from the system operator indicating alignment cannot be completed and in response indicating to the system operator to adjust a seat height because the specific eye height value of the eye of the system operator is out of range for using the head-up display.

14. The method of claim 8, further comprising maintaining the fiducial at a predetermined fixed location on the combiner during the alignment process, wherein the specific eye height value is determined based on the predetermined fixed location of the fiducial.

15. The alignment system of claim 1, wherein the control module is configured to, while performing the alignment process, align the fiducial to be overlapping and centered on a predetermined portion of the first virtual image.

16. The alignment system of claim 1, wherein the control module is configured to, while performing the alignment process, align the portion of the first virtual image and the fiducial such that the fiducial is centered within the portion of the first virtual image.

17. The alignment system of claim 2, wherein:
the alignment object is a cross-hair; and
the control module is configured to, while performing the alignment process, center the fiducial in a center of the cross-hair.

18. The alignment system of claim 1, wherein the control module is configured to determine the specific eye height value of the eye of the system operator based on the angle of the mirror at completion of the alignment process.

19. The alignment system of claim 18, wherein the control module is configured to determine the specific eye height value of the eye of the system operator based on the angle of the mirror relative to a reference plane.

20. The alignment system of claim 1, wherein the control module is configured to determine the specific eye height value of the eye of the system operator based on a predetermined location of the fiducial.

21. An alignment system for a head-up display, the alignment system comprising:
at least one interface configured to receive a plurality of inputs from a system operator;
a mirror;
a mirror actuator configured to adjust at least one of a position or an orientation of the mirror;
a first light source configured to generate a first light beam, wherein the mirror is configured to direct the first light beam from the head-up display to a combiner to generate a first virtual image;
a second light source configured to generate a second light beam;
a fiducial optic assembly configured to direct the second light beam to the combiner to generate a fiducial on the combiner; and
a control module configured to,
perform an alignment process including, based on the plurality of inputs, controlling the mirror actuator to adjust the at least one of the position or the orientation of the mirror to adjust a vertical position of the first virtual image and align a portion of the first virtual image, the fiducial and an eye of the system operator, wherein the first virtual image is moved relative to the fiducial during adjustment of the at least one of the position or the orientation of the mirror,
subsequent to completing the alignment process, determining a height of the eye of the system operator based on an angle of the mirror, and
displaying a second virtual image based on the height of the eye of the system operator.

\* \* \* \* \*